(12) United States Patent
Monroe et al.

(10) Patent No.: US 6,987,267 B1
(45) Date of Patent: Jan. 17, 2006

(54) LENS BLIND FEATURE FOR MOTION DETECTOR

(75) Inventors: Tim Monroe, Fairfield, CA (US); Peter Chan, Guangdong (CN)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 48 days.

(21) Appl. No.: 10/704,085

(22) Filed: Nov. 7, 2003

(51) Int. Cl.
*G01J 5/02* (2006.01)

(52) U.S. Cl. ..................................... 250/342
(58) Field of Classification Search ............... 250/342, 250/253
See application file for complete search history.

(56) References Cited

U.S. PATENT DOCUMENTS

| | | |
|---|---|---|
| 3,958,118 A | 5/1976 | Schwarz |
| 4,960,995 A * | 10/1990 | Neumann et al. ........... 250/347 |
| 5,434,764 A | 7/1995 | Lee et al. |
| 5,442,532 A | 8/1995 | Boulos et al. |
| 5,626,417 A | 5/1997 | McCavit |
| 6,323,488 B1 * | 11/2001 | McCavit et al. ........... 250/347 |
| 6,346,705 B1 | 2/2002 | Lee et al. |
| 6,348,691 B1 | 2/2002 | Sandell et al. |

* cited by examiner

*Primary Examiner*—David Porta
*Assistant Examiner*—Marcus Taningco
(74) *Attorney, Agent, or Firm*—Paul Y. Feng; Fulwider Patton Lee & Utecht, LLP (57) ABSTRACT

A light fixture has motion detection circuitry enclosed within a motion detector housing. The motion detector housing contains at least one thermal detector such as a passive infrared sensor, the sensor having a detection angle. At least one adjustable blind is housed within the housing adjacent to the infrared sensor, and the blind is adjustable to block and limit the detection angle of the sensor. The blind may be directly connected to a knob on a control panel that allows the user to alter the angle of the blind. Two or more blinds may be used on the interior of the housing, to increase adjustability of the detection angle.

20 Claims, 8 Drawing Sheets

LENS BLIND FEATURE FOR MOTION DETECTOR

BACKGROUND OF THE INVENTION

The present invention relates to passive infrared motion detectors of the type used in residential outdoor lighting fixtures. The lighting fixtures may, for example, illuminate a walkway or driveway when a person or automobile approaches. The invention is more particularly directed to arrangements for limiting the detection angle of the motion detectors.

Lighting fixtures that automatically turn on a light when a person or a motor vehicle approaches have been known for some time. A popular form of such a lighting fixture includes a device that is responsive to infrared radiation emitted by a person or motor vehicle as the person or vehicle moves within the field of view of the device. These devices are generally referred to as passive infrared, or "PIR," motion detectors. These detectors are incorporated into the lighting fixture housing to trigger the lamp upon detection of the person, motor vehicle, or like heat emitting object.

PIR motion detectors in the prior art typically have a fixed field of view. However, the fixed field of view may be too wide or too narrow to fully meet a particular user's needs. For example, when an outdoor light with a motion detector is affixed to an exterior wall of a house, the motion detector may detect motion both within the user's own yard and also motion that occurs in a next door neighbor's yard. The user is not able to adjust the detection angle to exclude motion in the neighbor's yard from detection. There have been attempts at addressing the field of view of the motion detector.

For example, U.S. Pat. No. 5,442,532, issued Aug. 15, 1995, to Boulos et al., discloses an arrangement for adjusting the field of range of a motion detector that is built into the housing of a decorative lamp. In particular, a hexagonal fixture is turnable about a vertical axis to pivot the infrared detector and the associated motion detection circuitry. In this way, the user can modify the field of range by rotating the motion detector. This arrangement does not, however, allow the user to change the detection angle. Rather, it simply allows the user to shift the field of range to a different area.

U.S. Pat. No. 5,626,417, issued May 6, 1997, to McCavit, is directed to a decorative lamp with a motion sensor incorporated into the base of the housing. The base that contains the motion sensor may be rotated along a vertical axis relative to the rest of the housing to change the field of view of the motion sensor.

Others have used mirrored optics, lenses, or the like to control the field of view of the motion detector. Examples of such devices include U.S. Pat. No. 6,348,691 to Sandell et al.; U.S. Pat. No. 6,346,705 to Lee et al.; and U.S. Pat. No. 3,958,118 to Schwarz.

It is also known in the art to snap one or more plastic covers onto the outside of the housing to limit the detection angle of the motion sensor. Another known approach is to glue a piece of tape across a portion of the aperture through which signals pass, thereby limiting the angle of detection. However, both approaches are unsightly, somewhat cumbersome to implement, and cannot withstand the effects of weather if the lamp and detector are used outdoors.

SUMMARY OF THE INVENTION

The present invention relates to a light fixture with motion detection circuitry. At least one thermal radiation detector, such as a passive infrared sensor, is disposed within a motion detector housing. A blind system is also internal to the housing. The blind system is moveable and adjustable in order to allow the user to customize the detection angle of the motion detector. That is, the blind system can selectively cover or uncover a portion of the signal path of the motion detector as desired.

Certain embodiments of the invention may incorporate particular features. For example, a control panel having a blind adjustment knob located outside of the motion detector housing may be provided. The blind may be connected with the adjustment knob so that rotating the knob also rotates the blind. In certain embodiments, more than one blind may be employed. Each blind may optionally be interconnected with a separate adjustment knob so as to be independently movable.

In various exemplary embodiments, the blind is made from a non-reflective polymer. It preferably has a rectangular flag shape and pivots on a vertical axis stalk. As such, the user may rotate the blind as needed to block out or limit some, all, or none of the detection angle of the motion detector. Further, the pivot axis of the blind may be vertical, horizontal, or angled, depending on what portion of the field of view of the motion detector is intended to be blocked.

Other aspects, features and advantages of the invention, its configuration, construction, and operation will be best understood from the following detailed description taken in conjunction with the accompanying drawings.

DETAILED DESCRIPTION OF THE PREFERRED EMBODIMENTS

Figure 1:
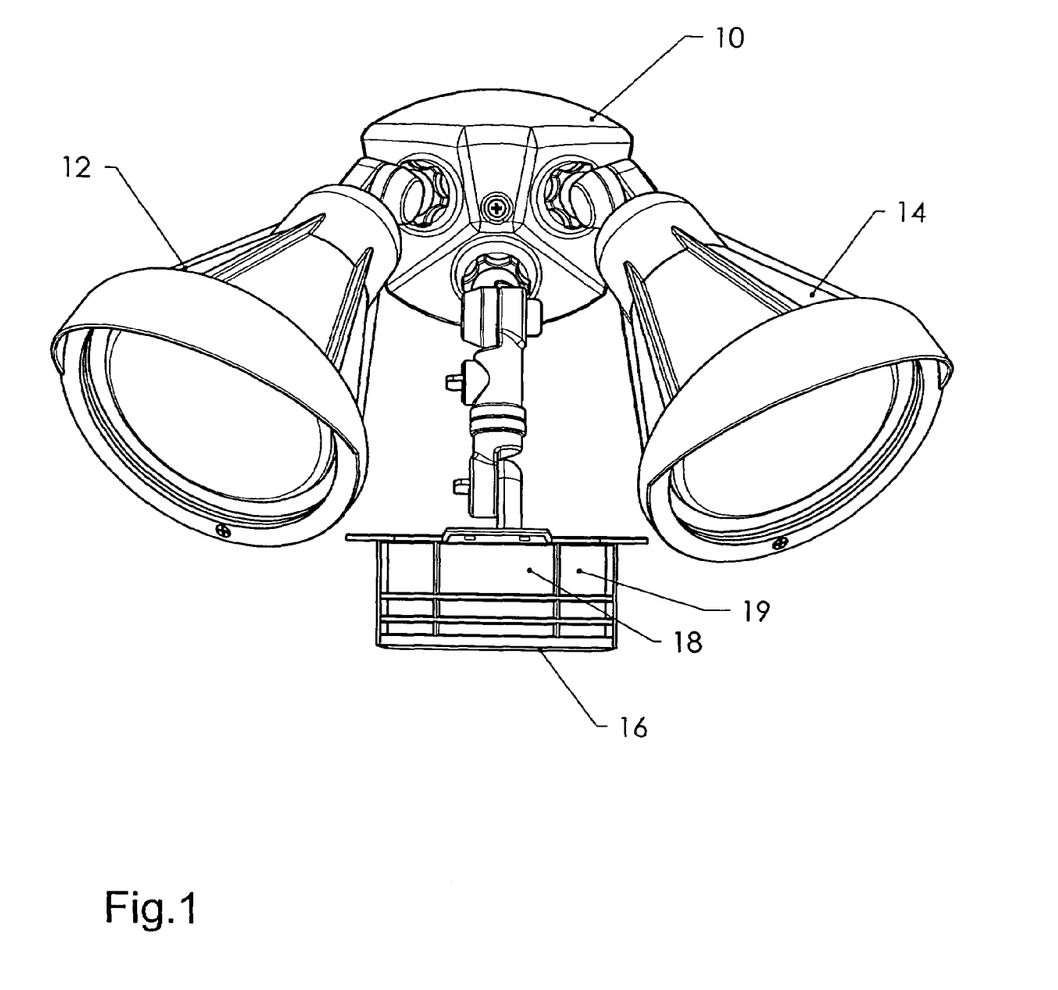
FIG. 1 is a perspective view of a dual light security light system having a motion detection housing.

The present invention is directed to a light fixture having a motion detector incorporated therein, wherein the motion detector includes one or more adjustable internal blinders that limit the signals reaching motion detector. FIG. 1 illustrates one embodiment of the present invention. Specifically, FIG. 1 is a front elevational view of a dual flood light assembly 10 having flood lights 12 and 14, and a housing 16 in which motion detection circuitry resides. The housing 16 in the exemplary embodiment is separate and discrete from the lights 12, 14. On the other hand, in various alternative embodiments, the motion detector housing may be incorporated into the lamp housing in a one-piece or integrated design.

The housing 16 includes an aperture or window 18 through which infrared radiation may pass. An optional lens 19 covers the window 18. The lens 19 may be a Fresnel type or may be a plain sheet of translucent or transparent polymer. The lens 19 is preferable designed to pass infrared wavelength radiation for the purpose of detecting body heat.

In operation, the lights 12 and 14 are usually turned off at night. However, the unit may be set such that when the motion detector detects motion within its field of view, the lights 12 and 14 are turned on for a period of time. In the embodiment of FIG. 1, the circuitry for automatically turning the lights on and off is housed within housing 16.

Those skilled in the art understand that the motion detector detects motion only within its field of view, which is defined by a detection angle. Standard lighting units having motion detectors may have any of a wide range of different detection angles. For example, in some commercially available lighting units, the detection angle is 240 or 270 degrees. That is, a lighting unit having a motion detector with a detection angle of 240 degrees is able to sense motion anywhere within a detection angle of 240 degrees.

Figure 2:
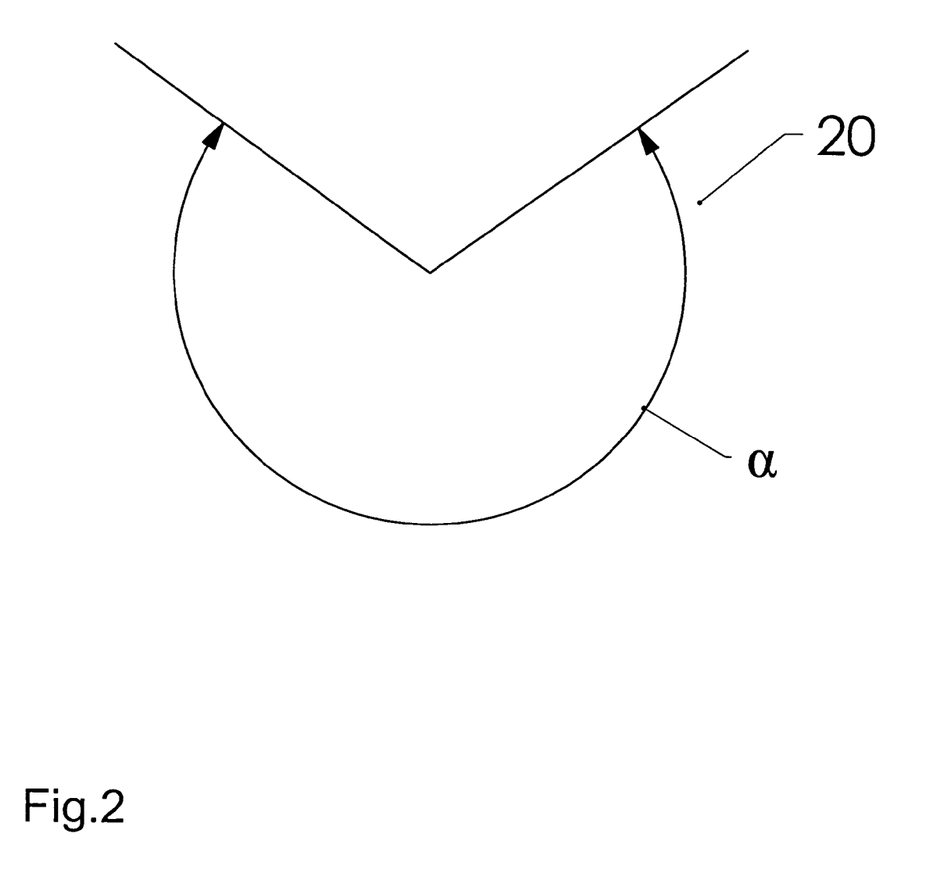
FIG. 2 illustrates the concept of a detection angle.

FIG. 2 illustrates a field of view 20. The field of view has a detection angle $\alpha$, and the motion detector in the motion detector housing 16 is able to sense infrared radiation from anywhere within an angular detection range $\alpha$. The detection angle $\alpha$ may be too narrow or too wide in a given setting. For example, in the case of a lighting fixture mounted near a garage door, the user may want the motion detector to sense motion in either the driveway as when a car is pulling into the driveway, or in yard areas on either side of the driveway. Consequently, the user may wish to increase the detection angle $\alpha$.

Figure 3:
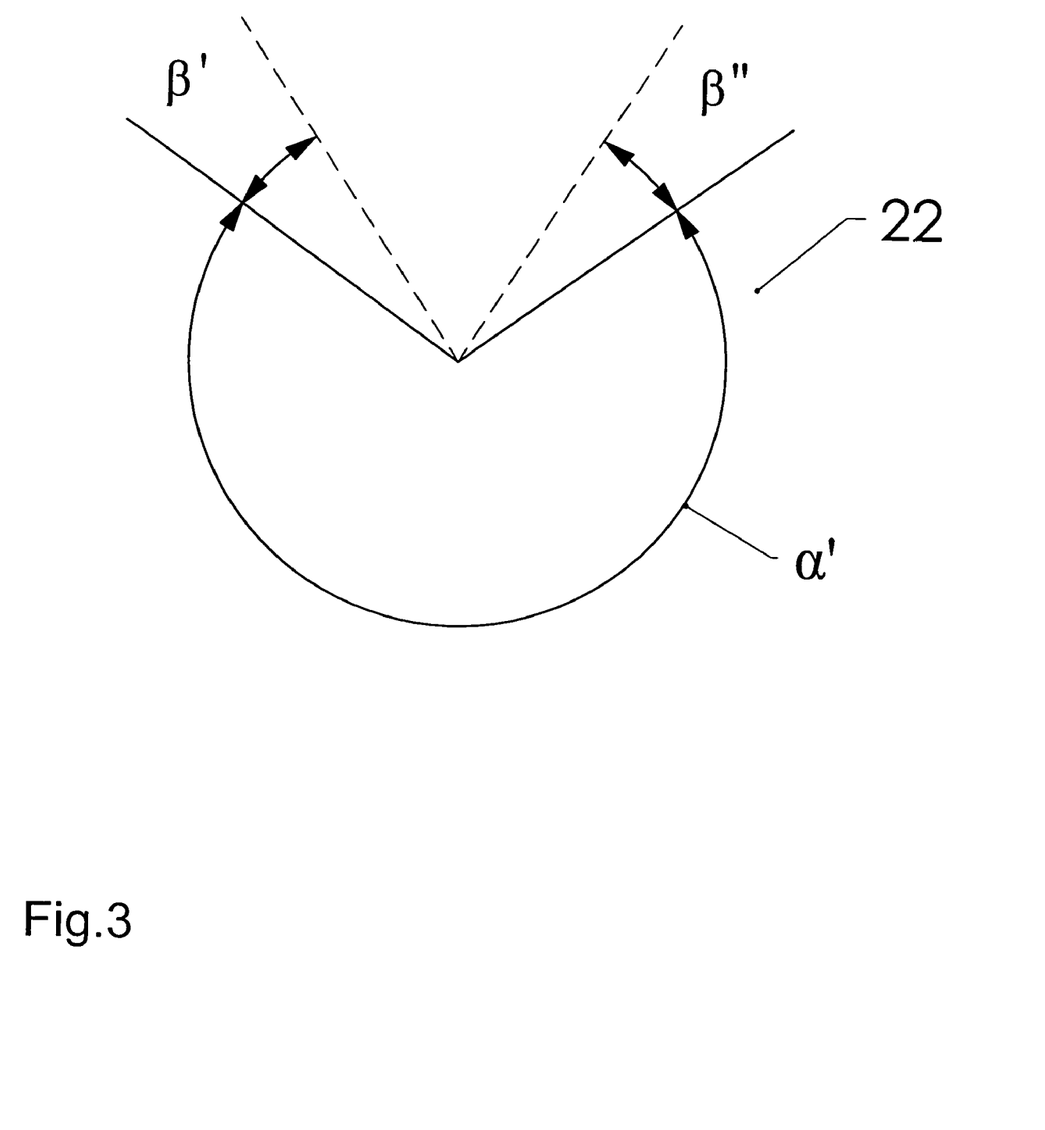
FIG. 3 illustrates a detection angle that has been increased by an angular total of $\beta'+\beta''$ by moving a blind on one side of the motion detector an angle $\beta'$ and by moving another blind on the other side of the motion detector an angle $\beta''$, as can be accomplished with an embodiment of the present invention.

FIG. 3 illustrates an altered field of view 22 in which the detection angle $\alpha$ is increased by angular changes $\beta'$ and $\beta''$. $\beta'$ and $\beta''$ represent angular increases in the detection angle caused by utilizing an internal system of blinds according to the present invention. The resulting detection angle $\alpha' = \alpha + \beta' + \beta\Delta$. The blinds are housed within the housing 16 and allow the user to adjust the detection angle.

In the foregoing example, the detection angle has been increased by moving the respective blinds in one direction to expose the motion detector to a greater field of view. It is to be understood that, conversely, the detection angle can be reduced by moving the respective blinds to block the field of view of the motion detector. Further, the angle of detection is preferably defined along the azimuth, but the present invention may be employed in alternative embodiments to control the angle of detection for elevations above the horizon.

Figure 4:
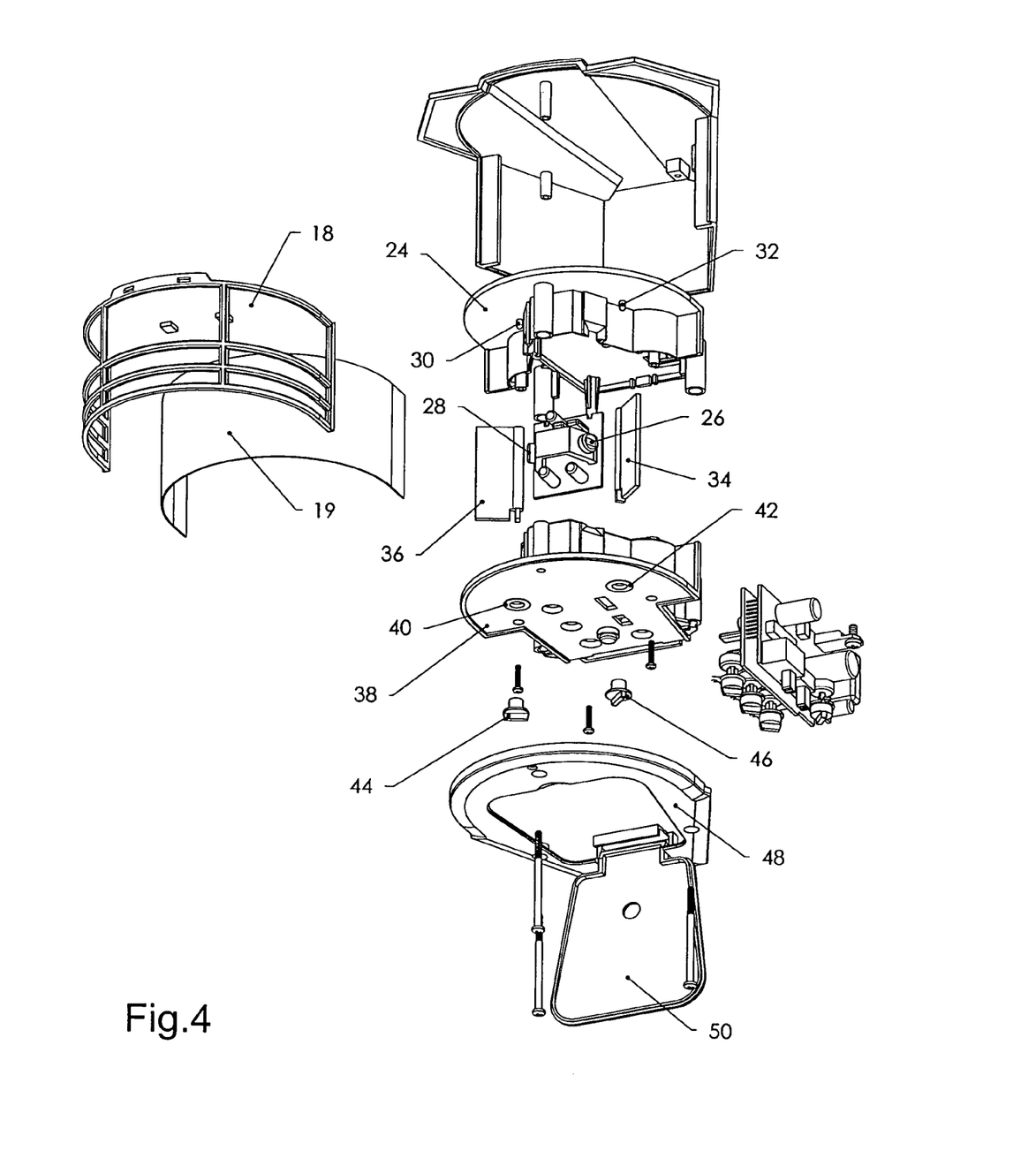
FIG. 4 is an exploded view of an embodiment of a motion detector housing and the parts therein, including the blind system.

FIG. 4 is an exploded view of components of the housing 16. In this embodiment the housing includes a structure 24 on which are mounted thermal radiation detectors, preferably passive infrared radiation (PIR) sensors 26 and 28. The sensors 26, 28 are preferably arranged at an angle as shown. Other arrangements are contemplated, and more or fewer than two sensors can be used. Two LED indicator lights 30 and 32 inform the user of the operation of the motion detector.

The unit also includes internal blinds 34 and 36 that are rotatably mounted within the housing 16. It is these blinds 34 and 36 which serve to limit, enlarge, or otherwise control the detection angle of the PIR sensors 26 and 28.

The unit also includes a control panel 38 having control knobs 40 and 42 with corresponding ribs 44 and 46. The internal blinds 34 and 36 having respective cylindrical stalks extending from inside the housing through the control panel 38 to the exterior of the housing to be accessible by the user's fingers. The control knobs 40, 42 are connected to the blinds 34, 36 via the stalks. Because the stalks extend vertically, the blinds 34, 36 pivot along their respective vertical axes. This pivoting action is controlled and set by the user by twisting on the control knobs 40, 42. There is optionally some friction engaging the stalks so that once the detection angle as defined by the blinds 34, 36 is set, the blinds cannot inadvertently shift from their positions. An optional protective face plate 48 having a hinged door 50 may cover the bottom of the assembly to protect the control panel 38 from the outdoor elements.

Figure 5:
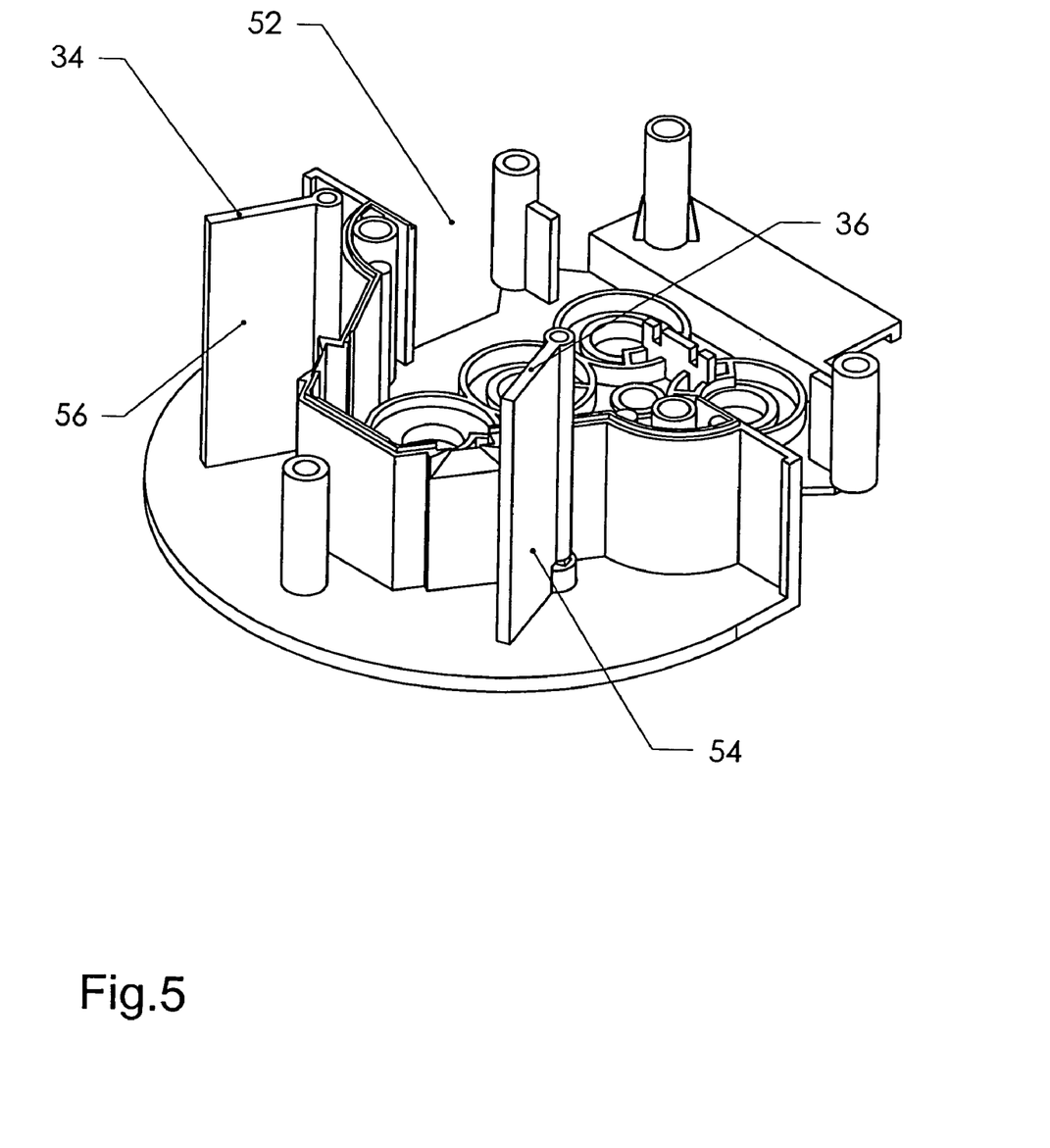
FIG. 5 is a perspective view of a component of the interior of the motion detector housing, illustrating the moveable blinds.

FIG. 5 illustrates the blind assembly 52 in more detail. The blinds 34 and 36 each rotate about a respective axis, independent of one another. The blinds include respective plate sections 54 and 56 which serve to block infrared radiation that enters window 18 (FIG. 1) before the radiation reaches the infrared sensors, and thereby limits the detection angle of the sensors.

In the embodiment shown, each blind 54, 56 when seen with its vertical axis stalk has a rectangular flag shape. Many shapes are contemplated aside from rectangles, including squares, triangles, trapezoids, semicircles, circles, and other polygonal and arcuate shapes. Naturally, the shape or shapes selected for the blinds are determined by many factors including the size and shape of internal space available within the housing, the location of the sensor or sensors, the field of view of the sensor, the anticipated location of the source of the thermal radiation, the anticipated location of where the detector will be mounted, etc. Further, the shapes of the blinds 54, 56 do not have to be identical as shown in FIG. 5; that is, each blind can have a shape unique from or complementary to the other.

Preferably, the blinds 54, 56 are made from an opaque polymer that has low radiation reflectivity, especially in the infrared wavelength. In various alternative embodiments, the blinds can be translucent or half-silvered for partial reduction or filtering of radiation. Also, the blinds may have a reflective coating or covering to redirect infrared or like radiation to the sensors.

Figure 6:
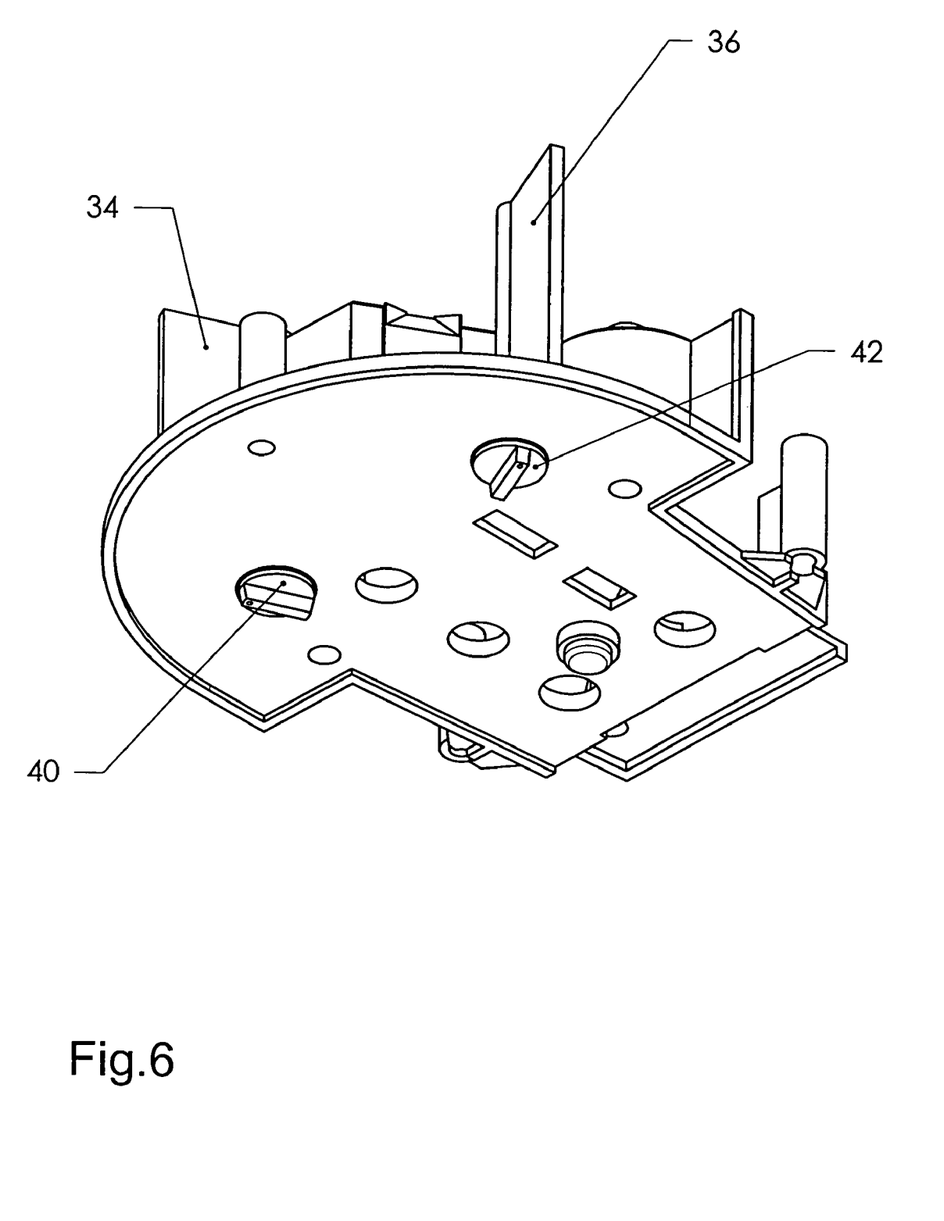
FIG. 6 is another view of the control panel having knobs for adjusting the angular position of the blinds.

FIG. 6 illustrates the control knobs 40 and 42 which are directly connected to the respective blinds 34 and 36. In practice, the user is able to adjust the detection angle of the infrared sensors by rotating the control knobs 40 and 42. As the control knobs 40 and 42 are rotated, the corresponding blinds 34 and 36 also rotate inside the housing. As the interior blinds 34 and 36 rotate, the angle of detection is thereby increased or decreased.

Figure 7:
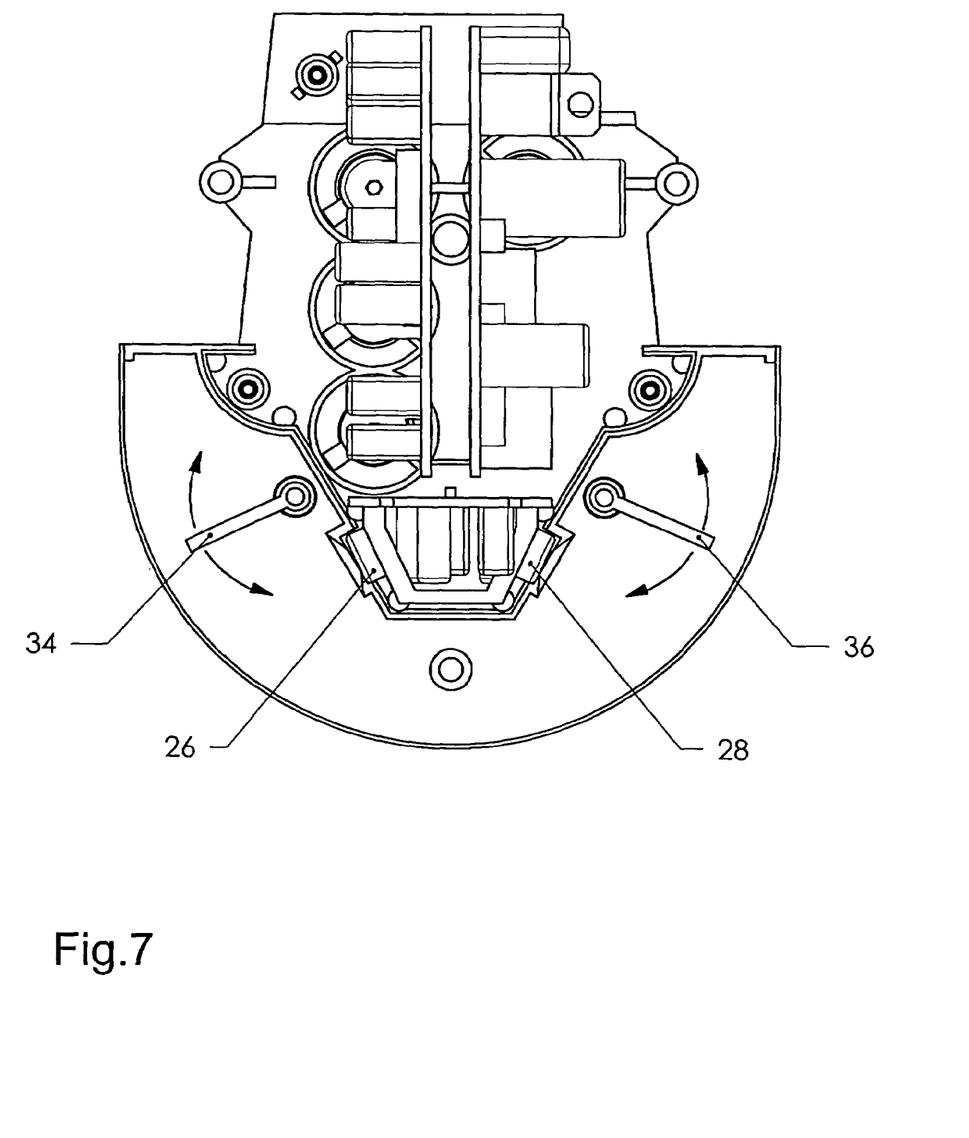
FIG. 7 is a top view of the component of FIG. 6, showing the interior of the housing, including the motion detection sensors and the corresponding adjustable blinds.

FIG. 7 is a top plan view showing more particularly how the blinds 34 and 36 rotate about their positions as indicated by the arrows. In this embodiment, there are two passive infrared radiation sensors 26 and 28. The blind 34 is adjacent to passive infrared sensor 26, while the blind 36 is adjacent to the passive infrared sensor 28. The angle of detection of the system is defined by the angle formed in between the blinds 34 and 36. Note that the blinds 34 and 36 are independently moveable, so that one blind may be adjusted more or less than the other, to give the user significant flexibility in defining the field of view. That is, the field of view may be asymmetrical. It should also be apparent that the blinds 34, 36 at their extreme range of rotation can completely cover or expose the infrared sensors 26, 28. If the sensor is covered, it is essentially disabled; if the sensor is completely exposed, the blind has no effect on the field of view.

In the preferred embodiment shown in FIG. 7, there is one blind positioned adjacent each sensor. It is contemplated that there can be more than one blind per sensor, and the locations of the blinds can be situated anywhere adjacent the field of view of the sensor. As mentioned earlier, the blinds shown in the drawings pivot along a vertical axis to control the angle of detection along the azimuth, but the same principles can be applied to blinds that pivot along a horizontal axis to block off an angle of detection for elevations above the horizon.

Figure 8:
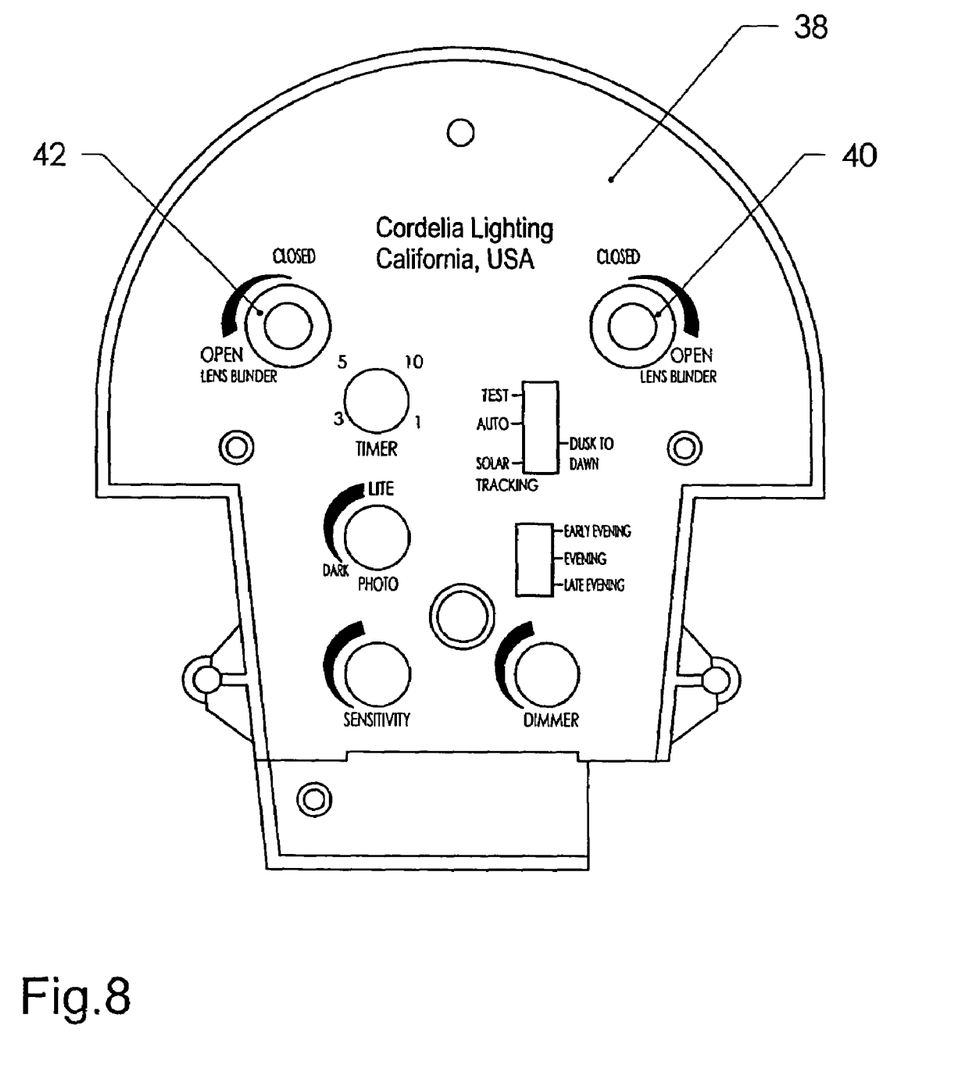
FIG. 8 is a bottom view of an embodiment of a control panel situated underneath the motion detector housing.

FIG. 8 illustrates the control panel 38 in greater detail. The control knobs 40 and 42 are located adjacent to indicia indicating which direction to turn the knobs in order to open or close the field of view. That is, as control knob 40 is turned in a clockwise direction, the blind 34 is rotated outwardly and the detection angle increases. Similarly, as control knob 42 is rotated in a counterclockwise direction the blind 36 is rotated outwardly and the detection angle becomes wider.

It is noted that control panel 38 may include numerous other controls for the motion detector and light fixture. For example, the control panel has: a timer setting switch that determines how long the lamp remains lit after being triggered; a photodiode to determine daylight or night and sensitivity trim control; a sensitivity control for the motion detector; a dimmer control for the lamp; self-test, timing, and other operational slide switches, and the like. The illustrated embodiment in FIG. 8 places the blinder control knobs 40, 42 at a convenient location on the control panel 38 next to the other controls. This allows for easy access to all controls by the user. Further, the control panel 38 is located underneath the housing and since the fixture is typically mounted up high, the user has easy access to the controls from below.

The above descriptions and drawings disclose illustrative embodiments of the invention. Given the benefit of this disclosure, those skilled in the art will be able to devise various modifications, alternative constructions, and equivalent ways for achieving the advantages of the invention.

Considering further modifications, the lighting fixtures with motion detector of the present invention are not limited to a security type spotlight as shown and described. For instance, the present invention is applicable to indoor or outdoor decorative lighting fixtures as well and may extend to commercial lighting fixtures. Also, the motion detector housing may be integral to the lighting fixture, such as with a lamp, in which the motion detector is incorporated into the lamp housing. Therefore, the invention is not to be limited to the descriptions and examples disclosed herein, but is defined by the appended claims.

What is claimed is:

1. A light fixture with motion detection circuitry, comprising:
 a motion detector housing;
 at least one thermal sensor within said housing, said sensor having a detection angle; and
 at least one adjustable blind within said housing adjacent to said thermal sensor, said blind including a plate that pivots to at least partially block the detection angle.

2. A light fixture with motion detection circuitry as defined in claim 1, wherein said light fixture further comprises a control panel having a blind adjustment knob, said blind directly connecting to said knob.

3. A light fixture with motion detection circuitry as defined in claim 1, wherein said light fixture further comprises at least two movable blinds, one on each side of said at least one sensor.

4. A light fixture with motion detection circuitry as defined in claim 3, wherein said at least two movable blinds are independently moveable.

5. A light fixture with motion detection circuitry as defined in claim 3, wherein said light fixture further comprises a control panel having at least two blind adjustment knobs, each said knob directly connecting to a respective blind and rotating about an independent axis.

6. A light fixture with motion detection circuitry as defined in claim 1, wherein said light fixture further comprises at least two passive infra-red sensors.

7. A light fixture with motion detection circuitry as defined in claim 6, wherein said light fixture further comprises a blind adjacent to each sensor.

8. A light fixture activated by a thermal radiation detector incorporated into said lighting fixture for monitoring motion in a field of view having a detection angle, comprising:
 a detector housing defining an aperture for admitting thermal radiation from the field of view and including a thermal radiation detector disposed within said motion detector housing for receiving said thermal radiation;
 at least one blind including a plate that pivots within the housing adjacent to said detector; and
 at least one blind control stalk extending outside of the detector housing and connected to the at least one blind that pivots to adjust the angle of said plate relative to said detector, thereby at least selectively and partially blocking the detection angle of said detector.

9. A light fixture as defined in claim 8, wherein said light fixture further comprises a control panel having a blind adjustment knob connected to the stalk.

10. A light fixture as defined in claim 8, wherein said light fixture further comprises at least two independently movable blinds, one on each side of said detector.

11. A light fixture as defined in claim 8, wherein said at least one blind includes a rectangular flag shape.

12. A light fixture as defined in claim 8, wherein said thermal radiation detector further comprises a passive infra-red radiation sensor.

13. A light fixture as defined in claim 12, wherein said thermal radiation detector is rotationally immobile along a vertical axis.

14. A fixture with motion detection circuitry for detecting motion within a field of view having a detection angle, comprising:
 a motion detector housing;
 means within said housing for detecting thermal radiation; and
 means within said housing for selectively limiting the detection angle including a plate that at least pivots into the detection angle.

15. A fixture with motion detection circuitry for detecting motion as defined in claim 14, wherein said means within said housing for detecting thermal radiation comprises a passive infra-red motion detector.

16. A fixture with motion detection circuitry for detecting motion as defined in claim 14, wherein said means within said housing for selectively limiting the detection angle comprises at least one blind.

17. A fixture with motion detection circuitry for detecting motion as defined in claim 14, wherein said means within said housing for selectively limiting the detection angle comprises at least two blinds, with a corresponding blind on each opposing side of said means for detecting thermal radiation.

18. A fixture with motion detection circuitry for detecting motion as defined in claim 14, wherein said light fixture includes a control panel having a control knob, and said means within said housing for selectively limiting the detection angle includes a blind being directly connected to said control knob.

19. A fixture with motion detection circuitry for detecting motion as defined in claim 16, wherein said at least one blind includes a non-reflective polymer.

20. A fixture with motion detection circuitry for detecting motion as defined in claim 14, wherein said means within said housing for selectively limiting the detection angle includes a blind rotating about at least one of a vertical axis and a horizontal axis to at least selectively and partially block the detection angle.

* * * * *

UNITED STATES PATENT AND TRADEMARK OFFICE
CERTIFICATE OF CORRECTION

PATENT NO. : 6,987,267 B1  Page 1 of 1
DATED : January 17, 2006
INVENTOR(S) : Tim Monroe et al.

It is certified that error appears in the above-identified patent and that said Letters Patent is hereby corrected as shown below:

<u>Column 3,</u>
Line 41, delete "Δ" and insert -- " --.

Signed and Sealed this

Thirtieth Day of May, 2006

JON W. DUDAS
*Director of the United States Patent and Trademark Office*